United States Patent
Watanabe

(10) Patent No.: US 8,537,247 B2
(45) Date of Patent: Sep. 17, 2013

(54) PHOTOGRAPHING DEVICE WHICH MEASURES AZIMUTH DURING PHOTOGRAPHING

(75) Inventor: Kohei Watanabe, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 27 days.

(21) Appl. No.: 13/277,485

(22) Filed: Oct. 20, 2011

(65) Prior Publication Data

US 2012/0098982 A1   Apr. 26, 2012

(30) Foreign Application Priority Data

Oct. 21, 2010   (JP) ................................. 2010-236027

(51) Int. Cl.
  *H04N 5/262*   (2006.01)
(52) U.S. Cl.
  USPC ........................................ 348/239; 348/222.1
(58) Field of Classification Search
  USPC .................. 348/207.99, 239, 222.1, 362, 363
  See application file for complete search history.

(56) References Cited

U.S. PATENT DOCUMENTS

| 6,385,133 | B1 | 5/2002 | Miyauchi | |
| 2003/0231243 | A1* | 12/2003 | Shibutani | 348/207.99 |
| 2008/0095402 | A1* | 4/2008 | Kochi et al. | 382/103 |
| 2010/0125414 | A1* | 5/2010 | Okuyama et al. | 701/217 |
| 2012/0268621 | A1* | 10/2012 | Kanma et al. | 348/222.1 |

FOREIGN PATENT DOCUMENTS

| JP | 2005-072949 A | 3/2005 |
| JP | 2008-199319 A | 8/2008 |
| JP | 2009-081780 A | 4/2009 |
| JP | 2011-139375 A | 7/2011 |
| WO | WO 99/67596 A1 | 12/1999 |

OTHER PUBLICATIONS

Japanese Office Action dated Jan. 31, 2012 (and English translation thereof) in counterpart Japanese Application No. 2010-236027.

* cited by examiner

*Primary Examiner* — Tuan Ho
*Assistant Examiner* — Zhenzhen Wu
(74) *Attorney, Agent, or Firm* — Holtz, Holtz, Goodman & Chick, PC

(57) ABSTRACT

Disclosed is a photographing device comprising: a photographing unit; a shutter operating unit; a geomagnetic sensor which detects geomagnetism; an electric actuator unit which is electrically driven to generate magnetic field; a drive control unit which turns the electric actuator unit into a non-driven state, within a predetermined period after an operation is entered through the shutter operating unit; and a shooting azimuth calculation unit which captures an output from the geomagnetic sensor within the predetermined period, and calculates azimuth based on the captured output.

12 Claims, 7 Drawing Sheets

PHOTOGRAPHING DEVICE WHICH MEASURES AZIMUTH DURING PHOTOGRAPHING

CROSS-REFERENCE TO RELATED APPLICATIONS

This application is based upon and claims the benefit of priority under 35 USC 119 of Japanese Patent Application No. 2010-236027 filed on Oct. 21, 2010, the entire disclosure of which, including the description, claims, drawings, and abstract, is incorporated herein by reference.

BACKGROUND OF THE INVENTION

1. Field of the Invention

The present invention relates to a photographing device which measures azimuth during photographing, a method of controlling a photographing device, and a recording medium.

2. Description of the Related Art

In the field of digital camera, there has been proposed a function of measuring azimuth during photographing, and storing a captured image data attached with data regarding shooting direction.

Japanese Laid-Open Patent Publication No. 2008-199319 discloses a technique of adding azimuth information to a captured image data, when the azimuth information differs between those obtained before and after the time of shooting, by determining the azimuth information just at the time of shooting by optimization.

SUMMARY OF THE INVENTION

It is, therefore, a main object of the present invention to provide a photographing device capable of accurately measuring azimuth during photographing, a method of controlling a photographing device, and a recording medium.

According to an aspect of the present invention, there is provided a photographing device comprising:

a photographing unit;

a shutter operating unit;

a geomagnetic sensor which detects geomagnetism;

an electric actuator unit which is electrically driven to generate magnetic field;

a drive control unit which turns the electric actuator unit into a non-driven state, within a predetermined period after an operation is entered through the shutter operating unit; and a shooting azimuth calculation unit which captures an output from the geomagnetic sensor within the predetermined period, and calculates azimuth based on the captured output.

According to another aspect of the present invention, there is provided a method of controlling a photographing device which includes an image capturing unit, a shutter operating unit, a geomagnetic sensor which detects geomagnetism, and an electric actuator unit which is electrically driven to generate magnetic field, the method comprising:

capturing a signal of the image capturing unit based on an operation entered through the shutter operating unit, and generating a captured image data;

turning the electric actuator unit into the non-driven state, within a predetermined period after the operation is entered through the shutter operating unit; and capturing an output from the geomagnetic sensor within the predetermined period, and calculating azimuth based on the captured output.

According to still another aspect of the present invention, there is provided a recording medium storing a program product which makes a computer, connected to an image capturing unit, a shutter operating unit, a geomagnetic sensor which detects geomagnetism, and an electric actuator unit which is electrically driven to generate magnetic field, embody:

a photographing function for capturing a signal of the image capturing unit based on an operation entered through the shutter operating unit, and generating a captured image data;

a drive control function for turning the electric actuator unit into the non-driven state, within a predetermined period after the operation is entered through the shutter operating unit; and a shooting azimuth calculation function for capturing an output from the geomagnetic sensor within the predetermined period, and calculating azimuth based on the captured output.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DETAILED DESCRIPTION OF THE INVENTION

An embodiment of the present invention will be explained, referring to the attached drawings.

Figure 1:
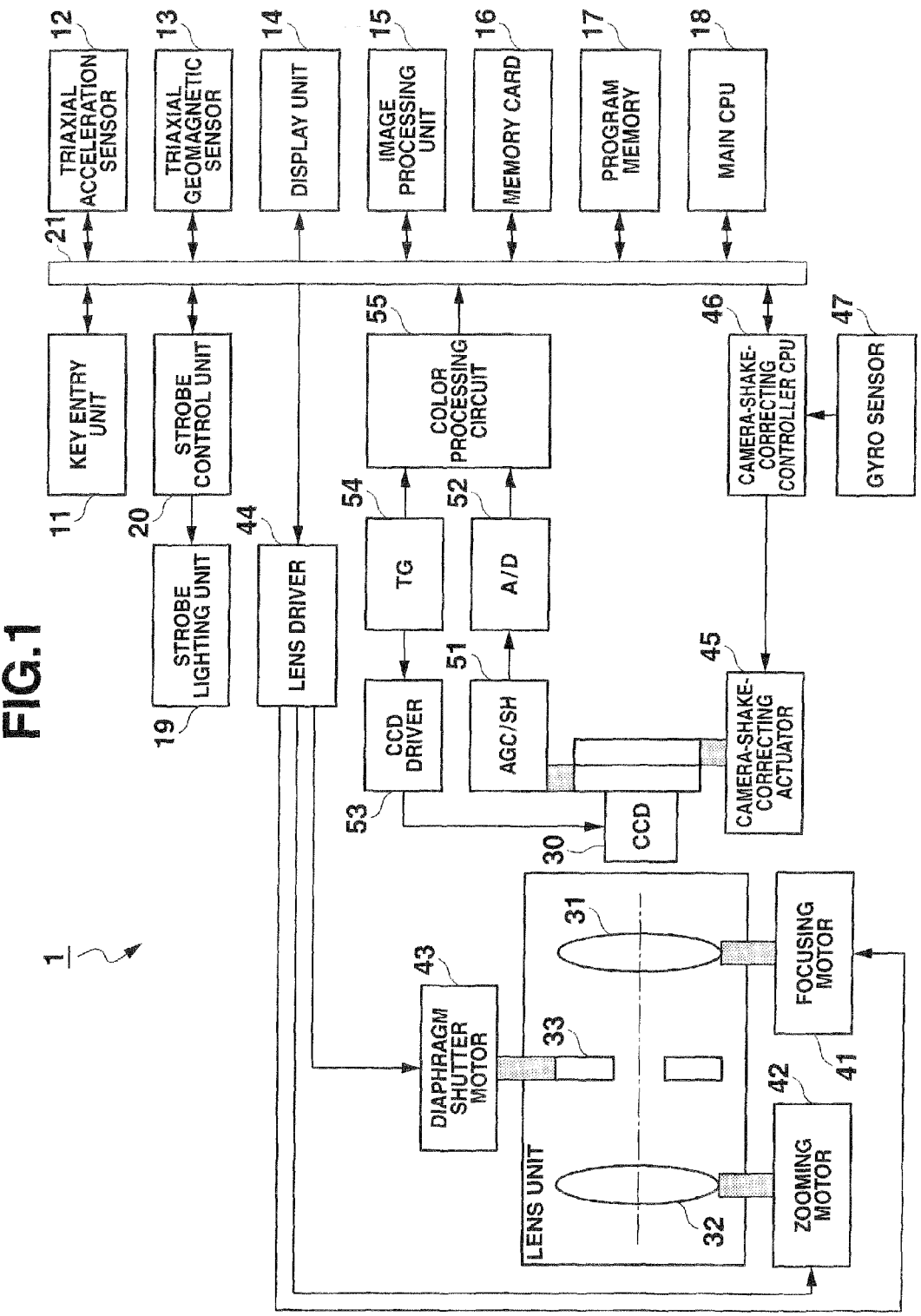
FIG. 1 is a block diagram illustrating an overall configuration of a digital camera according to an embodiment of the present invention.

FIG. 1 is a block diagram illustrating an overall configuration of a digital camera which is an embodiment of the photographing device.

A digital camera 1 of this embodiment has a function of measuring azimuth of shooting direction, and contains a key entry unit 11 having a plurality of operational buttons and operational keys allowing the user to enter therethrough operational commands, a triaxial acceleration sensor 12 which detects acceleration, a triaxial geomagnetic sensor 13 which detects geomagnetism, a display unit 14 on which images seen through a finder or captured images are output, an image processing unit 15 which processes the captured image in various ways, a memory card 16 (storage unit) which stores the captured image data, a program memory 17 having control data and control program stored therein, a main CPU (central processing unit) 18 which takes part in overall control of the device, a strobe lighting unit 19 which provides strobe lighting, a strobe control unit 20 which controls strobe lighting, and a bus 21 through which the main CPU 18 and the individual units are connected.

Among the constituents, the main CPU 18 functions as a drive control unit, a shooting azimuth calculation unit, an auto-focusing unit, and a dead-reckoning positioning unit.

The digital camera 1 also has an optical system configured by image capturing unit 30 such as CCD (Charge coupled device) which takes part in photographing, lenses 31, 32 through which an image is focused on the image capturing unit 30, a shutter 33 which opens or closes to control exposure of light onto the image capturing unit 30, a focusing motor 41 which functions as a focus drive unit for shifting the lens 31 for focal adjustment, a zooming motor 42 which varies a rate of magnification of an object by shifting the lens 32, a diaphragm shutter motor 43 which opens or closes the shutter 33, and a lens driver 44 which drives the individual motors (41, 42, 43).

The digital camera 1 also has a camera-shake-correcting actuator 45 which functions as a camera-shake-correcting actuator unit for correcting camera shake, by finely shifting the image capturing unit 30 in the direction normal to the optical axis, a gyro sensor 47 which measures angular velocity of the device for camera shake correction, a camera-shake-correcting controller CPU (camera-shake-correcting controller unit) 46 which controls operation of the camera-shake-correcting actuator 45 corresponding to output of the gyro sensor 47, an AGC (auto-gain control)/SH (Sample Hold) circuit 51 which appropriately amplifies and holds electric signals received from the image capturing unit 30, an A/D converter circuit 52 which converts the captured image signals into digital signals, a CCD driver 53 which drives the image capturing unit 30, a color processing circuit 55 which converts RGB-based captured image data into image data based on luminance and color difference codes, and a timing generator (TG) 54 which provides the CCD driver 53 and the color processing circuit 55 with synchronized process timing.

The photographing unit is configured by the above-described image capturing unit 30, the AGC/SH circuit 51, the A/D converter circuit 52, the CCD driver 53, the timing generator 54, and the color processing circuit 55.

The triaxial acceleration sensor 12 and the triaxial geomagnetic sensor 13 are used for the purposes of measuring azimuth of shooting direction, detecting the North in terms of an electronic compass function, and measuring relative direction and distance of travel by dead-reckoning positioning.

The triaxial acceleration sensor 12 outputs sensor signals which respectively represent magnitude of acceleration in the triaxial directions.

The triaxial geomagnetic sensor 13 outputs sensor signals which respectively represent magnitude of magnetism in the triaxial directions.

In the measurement of azimuth of shooting direction, the main CPU 18 first samples the sensor signals of the triaxial acceleration sensor 12, and calculates a direction of gravity based on the sampled data.

The main CPU 18 also samples the sensor signals from the triaxial geomagnetic sensor 13, and calculates a direction of geomagnetism based on the sampled data.

The main CPU 18 then determines a dip angle of a direction of shooting (direction of the center axes of the lenses 31, 32) of the digital camera 1, based on the calculated direction of gravity.

The main CPU 18 can calculate the azimuth of shooting direction, based on the dip angle and the direction of geomagnetism.

The outputs of the triaxial acceleration sensor 12 and the triaxial geomagnetic sensor 13 contain minor random errors.

Accordingly, when the azimuth of shooting direction is measured as described in the above, the main CPU 18 samples the outputs of the triaxial acceleration sensor 12 and the triaxial geomagnetic sensor 13 plural number of times within a short period.

The main CPU 18 is therefore configured to average the plurality of outputs from the sensors, so as to perform process of eliminating the random errors.

In the process of dead-reckoning positioning, the main CPU 18 also samples the outputs of the triaxial acceleration sensor 12 and the triaxial geomagnetic sensor 13, at a predetermined sampling frequency different from that in the process of measurement of the azimuth of shooting direction.

The main CPU 18 performs positioning by calculating the direction and distance of travel of the user who carries the digital camera 1, based on these sampled data.

For more details, the main CPU 18 calculates the number of steps of walking of the user, based on changes in acceleration in the vertical direction appeared in the outputs of the triaxial acceleration sensor 12.

The main CPU 18 then calculates the distance of travel, by multiplying the number of steps of walking by preliminarily set stride data.

The main CPU 18 also analyzes an output fluctuation pattern, unique to the walking motion, which appears in the outputs of the triaxial acceleration sensor 12, and determines a direction of travel based on the analytical results.

More specifically, during walking, the body of the user largely accelerates in the direction of travel, before and after the user steps ahead and then lands his or her feet.

Since also the digital camera 1, attached to the body of the user, moves similarly to the user, the motion appears in the form of fluctuation in the outputs of the triaxial acceleration sensor 12.

The main CPU 18 can determine in which direction the user is traveling, by analyzing the output fluctuation pattern.

The main CPU 18 is still also capable of calculating to which direction the digital camera 1 is directed, based on the outputs of the triaxial geomagnetic sensor 13 and the triaxial acceleration sensor 12.

Accordingly, the main CPU 18 determines the direction of travel of the user, as the azimuth, based on these results.

The main CPU 18 then typically multiplies location data of the start point entered by the user, with vector data composed of the distance and direction of travel determined as described in the above, and can calculate position data which represents the current location.

The digital camera 1 also has the focusing motor 41, the zooming motor 42, the diaphragm shutter motor 43, and the camera-shake-correcting actuator 45.

Each of these components has an electromagnetic coil, around which a magnetic field generates upon feeding of electric current therethrough.

The strobe lighting unit 19 has a charging circuit having a step-up transformer mounted therein, around which a magnetic field generates upon feeding of electric current to the transformer in the process of charging.

Accordingly, operations of these components adversely affect the triaxial geomagnetic sensor 13 due to the thus-generated magnetic fields, so that correct azimuth may not be obtained.

In other words, the focusing motor 41, the zooming motor 42, the diaphragm shutter motor 43, the camera-shake-correcting actuator 45, and the charging circuit of the strobe lighting unit 19 are understood as the electric actuator units, capable of magnetically affecting the triaxial geomagnetic sensor 13 when driven by electricity.

The key entry unit 11 has a plurality of operational keys used for switching the operational modes or entering various values to be set.

The key entry unit 11 also has a shutter button (shutter operating unit) through which the time of shooting is entered.

The shutter button is configured to allow therethrough entry of operational signals, respectively for the state of half pressing and full pressing.

The shutter button is configured to direct preparation for shooting when half-pressed, and to direct shooting when fully pressed.

The program memory 17 stores a control program product executed by the main CPU 18.

More specifically, the program memory 17 stores a program product for mode switching process, which switches operational modes based on entries made through the key entry unit 11.

In addition, also a program product for a shooting mode process, which enables shooting based on shutter operation made by the user, is stored.

These program products are stored not only in the program memory 17, but also in a portable recording medium such as optical disk, or in a non-volatile memory such as flash memory, which are readable through a data reading device by the main CPU 18.

Alternatively, the program products may be provided through a communication network while being mediated by carrier wave, to be downloaded into the digital camera 1.

Figure 2:
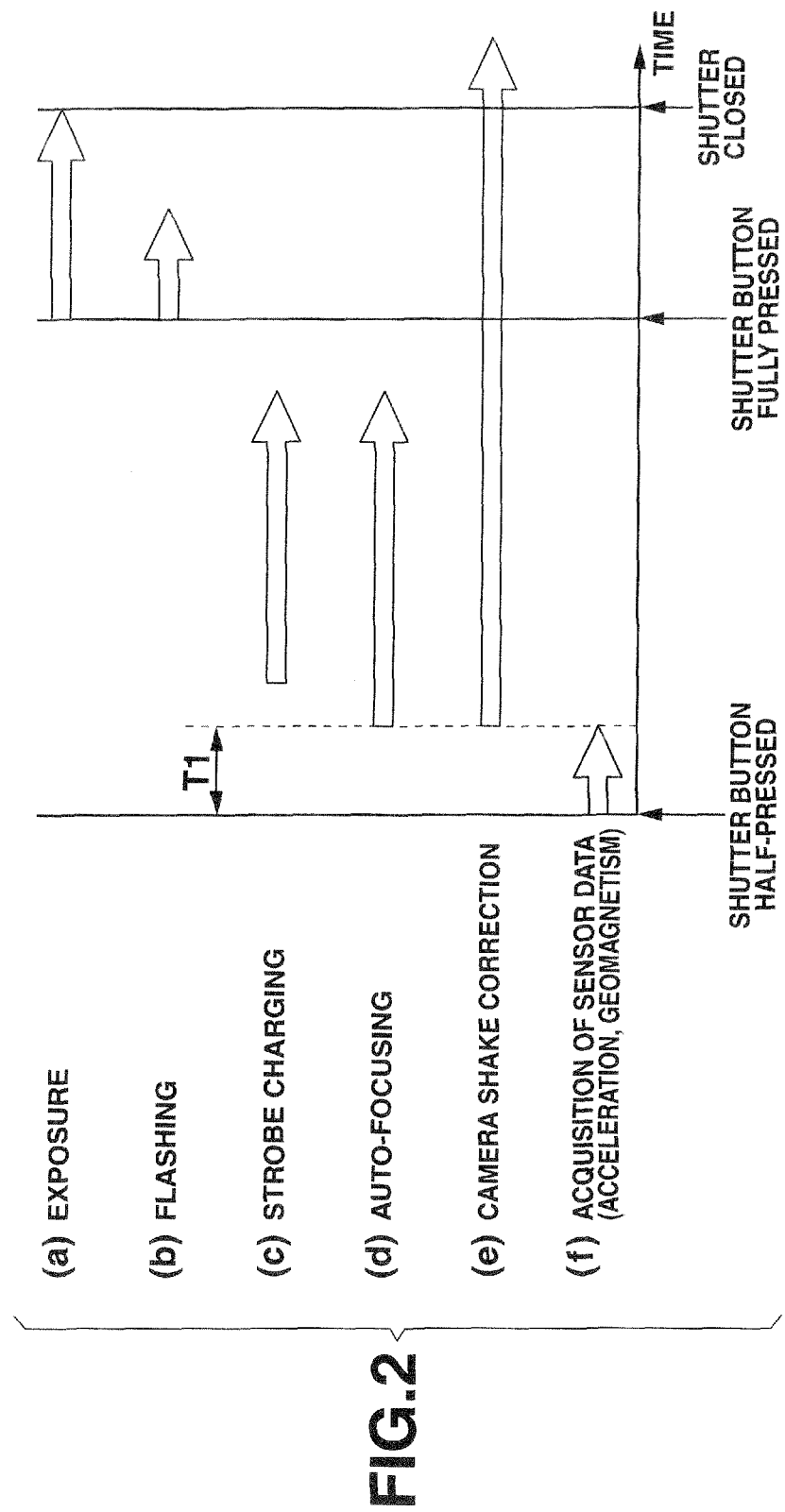
FIG. 2 is a timing chart illustrating operations of the individual units during photographing.

FIG. 2 is a timing chart illustrating operations of the individual units during photographing.

In FIG. 2, arrows shown on the right of operations (a) to (f) represent time spans over which the individual operations persist.

Figure 3:
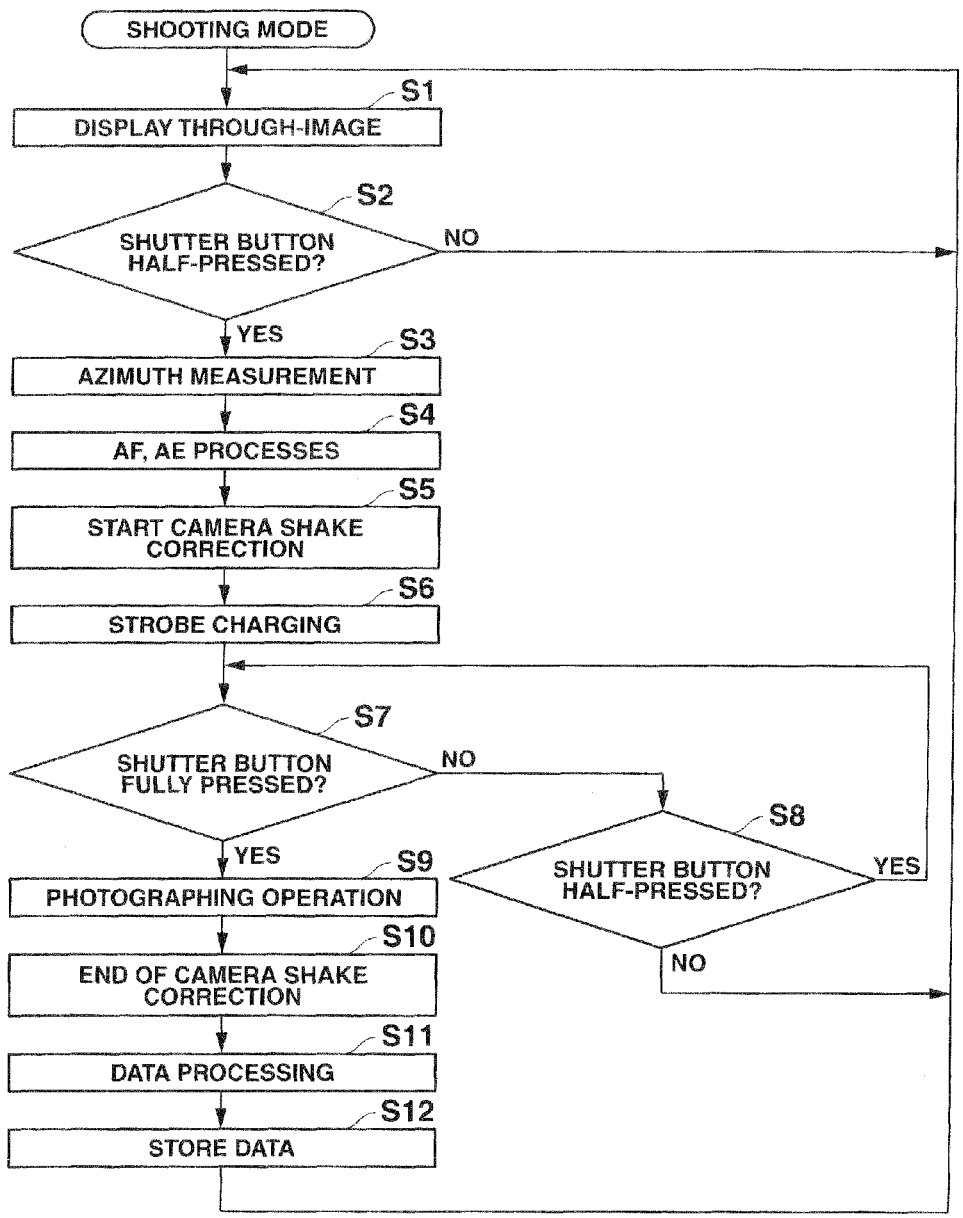
FIG. 3 is a flow chart illustrating procedures of controlling a shooting mode process executed by a main CPU.

FIG. 3 is a flow chart illustrating procedures of the shooting mode process executed by the main CPU 18.

By the digital camera 1 of this embodiment, control operations as described in the next are carried out in the shooting mode.

More specifically, as illustrated in the flow chart in FIG. 3, when brought into the shooting mode, the main CPU 18 first makes the image capturing unit 30 capture an image coming through the lenses 31, 32, and makes the display unit 14 output the image (referred to as through-image) (step S1).

The main CPU 18 judges whether the shutter button was half-pressed or not (step S2).

If the half-pressing was not detected, the process returns back to step S1, and the through-image is kept to be output.

In this state, upon half-pressing of the shutter button by the user after locating an object into the through-image, a process for preparing shooting begins.

More specifically, in order to measure azimuth of shooting direction, the main CPU 18 first samples the outputs of the triaxial acceleration sensor 12 and the triaxial geomagnetic sensor 13 at a preset sampling frequency (50 Hz, for example) for a short period (0.4 seconds, for example), to thereby capture the individual sampled data (step S3).

Over the sampling period, the main CPU 18 controls the motors and so forth (41, 42, 43, 45), which possibly generate magnetic fields therearound, so as not to be supplied with operational current.

The main CPU 18 also controls the strobe control unit 20 so as not to go into strobe charging.

Upon completion of the sampling process, the main CPU 18 executes auto-focus (AF) control and auto-exposure (AE) control (step S4).

The main CPU 18 issues a start command for camera shake correction (step S5), and issues a start command for strobe charging (step S6).

Under the control in step S4, the focusing motor 41 and the diaphragm shutter motor 43 are driven.

Upon issuing of command in step S5, the camera-shake-correcting actuator 45 is driven under the control of the camera-shake-correcting control CPU 46.

Upon issuing of command in step S6, the strobe control unit 20 executes strobe charging.

By these processes, the preparation for shooting completes.

The above-described steps S3 to S6 correspond to an operational control step.

Next, the main CPU 18 judges whether the shutter button was fully pressed or not (step S7).

If the operation was not detected, the main CPU 18 then judges whether the half-pressing of the shutter button persists or not (step S8).

If the half-pressing of the shutter button was detected, the process returns back to step S7.

On the other hand, if the half-pressing of the shutter button has been ended, the process returns back to step S1.

If the shutter button was judged to be fully pressed by the judgment in step S7, the main CPU 18 then executes photographing process (step S9; photographing step).

More specifically, the main CPU 18 drives the diaphragm shutter motor 43, so as to expose the image capturing unit 30 to light only within a predetermined period, and then closes the shutter 33.

During the process, the main CPU 18 issues a command towards the strobe control unit 20, so as to make the strobe lighting unit 19 cause flashing.

The main CPU 18 also makes the image processing unit 15 capture data of the captured image from the color processing circuit 55.

Upon completion of the photographing process, the main CPU 18 issues a command for terminating operations towards the camera-shake-correcting control CPU 46, and terminates the operation of the camera-shake-correcting actuator 45 (step S10).

The main CPU 18 still also makes the image processing unit 15 perform a predetermined image processing of the captured image data.

The main CPU 18 then calculates an azimuth of shooting direction, based on the sampled data of outputs from the sensors captured in step S3 (step S11).

The above-described processes in steps S3 and S11 correspond to the step of calculating the azimuth of shooting direction.

The main CPU 18 adds data regarding azimuth of shooting direction to the captured image data, and stores them in the memory card 16 (step S12).

Processes for a single shot thus complete, and the process returns back to step S1.

According to the shooting mode process, as illustrated in the timing chart in FIG. 2, the outputs of the triaxial acceleration sensor 12 and the triaxial geomagnetic sensor 13 are sampled, over a predetermined period T1 immediately after the half pressing of the shutter button by the user.

On the other hand, in this period T1, strobe charging operation, auto-focus control, and camera shake correction control are held in a standby mode.

In this way, the triaxial geomagnetic sensor 13 may successfully be prevented from being magnetically affected by the charging circuit of the strobe lighting unit 19, the focusing motor 41, and the camera-shake-correcting actuator 45, during sampling of the outputs from the sensors for measurement of azimuth.

Upon completion of sampling of the outputs from the sensors, strobe charging operation, auto-focus control, and camera shake correction control are executed as indicated by operations (c) to (e) in FIG. 2, and thereby the preparation for photographing completes.

Thereafter, upon full pressing of the shutter button by the user, flashing of light and exposure of the image capturing unit 30 for a predetermined period take place, as indicated by operations (a) and (b) in FIG. 2.

Figure 4:
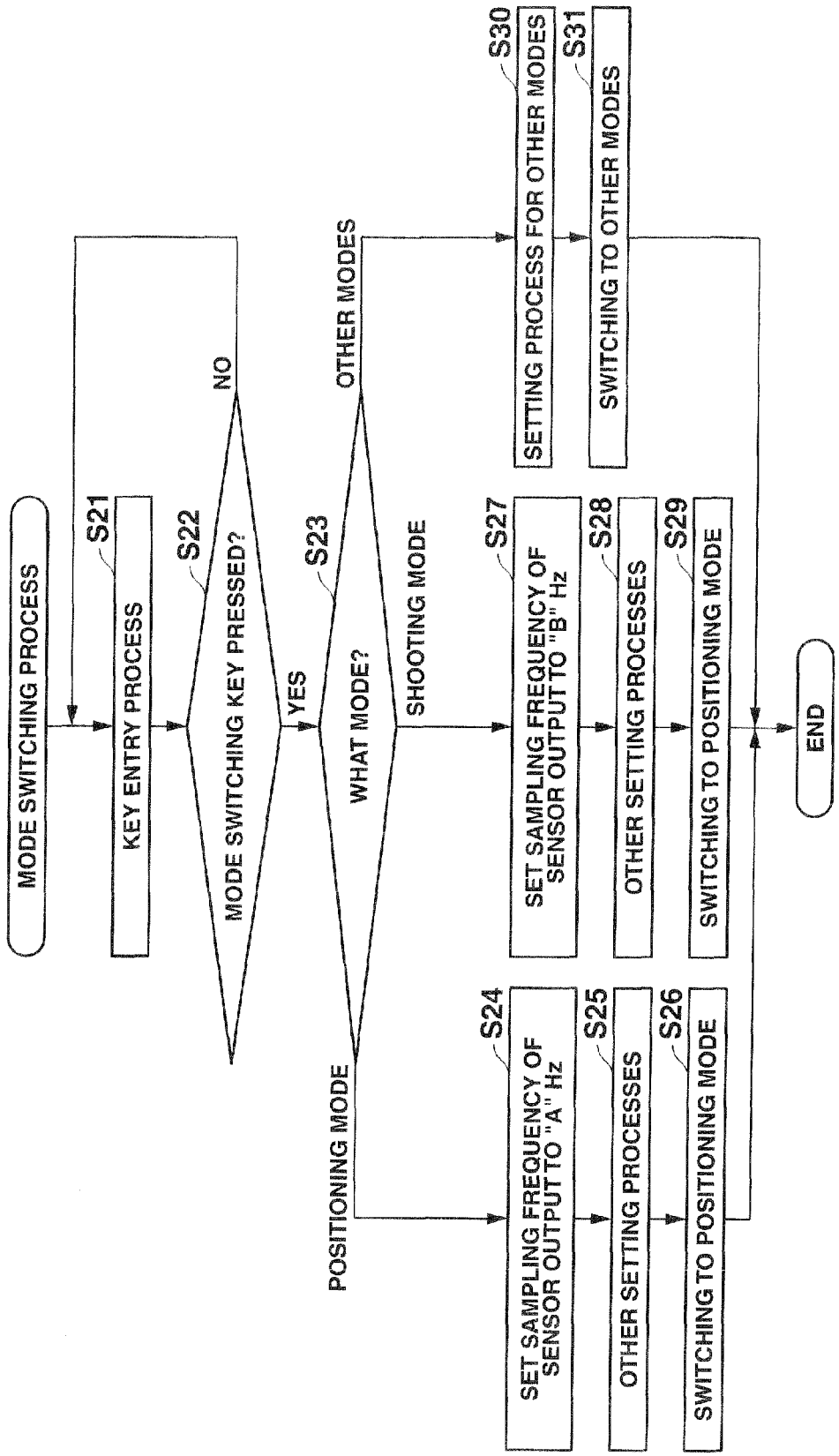
FIG. 4 is a flow chart illustrating procedures of controlling a mode switching process executed by the main CPU.

FIG. 4 is a flow chart illustrating procedures of controlling a mode switching process executed by the main CPU.

The mode switching process takes place, when the process advances to a mode switching menu upon operation by a predetermined key.

In this process, the main CPU 18 further processes an entry made through the key entry unit 11 (step S21).

Next, the main CPU 18 judges whether a key entry for switching mode has been detected (step S22).

If no key entry was detected, the process of the main CPU 18 returns back to step S21, and repeats the enter process through the key entry unit 11.

If the key entry for mode switching was detected, the main CPU 18 judges what mode was selected, and performs a branched process depending on the selected mode (step S23).

If the positioning mode was judged to be selected, the main CPU 18 executes operations and settings in steps S24 and S25 for the positioning mode.

More specifically, the main CPU 18 sets the sampling frequency, at which the outputs from the triaxial acceleration sensor 12 and the triaxial geomagnetic sensor 13 are captured in the positioning process, to "A" Hz (10 Hz, for example) (step S24).

The main CPU 18 also executes other various operations and settings (step S25).

The main CPU 18 switches the mode into the positioning mode (step S26).

The main CPU 18 then terminates the mode switching process.

In the process of positioning mode, it is necessary to detect fluctuation in the outputs from the triaxial acceleration sensor 12 and the triaxial geomagnetic sensor 13, which appears in association with the walking motion.

The fluctuation in the outputs in association with the walking motion falls approximately within a range of 2 Hz or smaller.

Accordingly, a sampling frequency of approximately 10 Hz may be good enough for sampling the outputs from the sensors in the positioning mode.

On the other hand, if the shooting mode was judged to be selected in step S23, the main CPU 18 executes operations and settings in steps S27 and S28 for the shooting mode.

More specifically, the main CPU 18 sets the sampling frequency, at which the outputs from the sensors are sampled in the process of measuring azimuth (step S3 in FIG. 3) in the shooting mode process, to "B" Hz (50 Hz, for example) (step S27).

The main CPU 18 also executes other various operations and settings (step S28).

The main CPU 18 switches the mode into the shooting mode (step S29).

The main CPU 18 then terminates the mode switching process.

In the shooting mode process, it is necessary to capture the outputs from the sensors a plural number of times in the period T1 (see FIG. 2) during which the preparatory processes for photographing, including auto-focus control, camera shake correction control, and strobe charging, are held in a standby mode.

Accordingly, the main CPU 18 changes the sampling frequency higher than that in the positioning process.

Since the outputs from the sensors may be captured a plural number of times within a short period in this way, the preparation for shooting may be completed quickly after half-pressing of the shutter button.

On the other hand, if another mode was judged to be selected in step S23, the main CPU 18 executes operations and settings adapted to the selected mode (step S30).

The main CPU 18 then switches the mode (step S31).

The main CPU 18 then terminates the mode switching process.

As described in the above, according to the digital camera 1 of this embodiment, the main CPU 18 brings the circuits which possibly generate magnetic fields therearound (the charging circuit for the strobe lighting unit 19, the focusing motor 41, the zooming motor 42, and the diaphragm shutter motor 43) into the non-driven state, over a predetermined period after the shutter button was operated.

The main CPU 18 is configured to capture the outputs from the triaxial geomagnetic sensor 13, and to calculate azimuth during the period.

Accordingly, the main CPU 18 can acquire less-affected outputs from the triaxial geomagnetic sensor 13, and can calculate accurate azimuth.

In addition, since the outputs from the triaxial geomagnetic sensor 13 are captured in a predetermined period after the shutter button was operated by the user, the user can readily recognize the azimuth at what timing is calculated.

In this way, the digital camera 1 of this embodiment can direct the user to perform photographing, so that an appropriate azimuth of shooting direction may be calculated with respect to the photographing.

More specifically, the digital camera 1 of this embodiment is configured to capture the outputs from the sensors within a predetermined period T1 after the shutter button is half-pressed, while holding the auto-focus control and camera-shake-correction control into a standby mode.

Accordingly, the azimuth of shooting direction may be calculated in a manner readily recognizable by the user, while keeping an operation pattern such that photographing is prepared by half-pressing of the shutter button, and the photographing is done by full-pressing of the shutter button.

In addition, since also the outputs from the triaxial acceleration sensor 12 are captured concurrently in the process of capturing the outputs from the triaxial geomagnetic sensor 13, the azimuth of shooting direction may be calculated taking the dip angle of the direction of shooting into consideration.

Even for the case of photographing while inclining the digital camera 1, the azimuth of shooting direction may accurately be calculated.

The sampling frequency for sampling the outputs from the triaxial geomagnetic sensor 13 in the process of measurement of azimuth of shooting direction is set higher than the sampling frequencies adopted in the process of dead-reckoning positioning, and in azimuth measurement based on electronic compass function.

Accordingly, the period over which the auto-focus control and camera-shake-correction control are held in a standby mode, may be shortened.

Moreover, the outputs from the sensors may be averaged by repeating sampling a plural number of times within a short period, and this enables calculation of accurate azimuth.

First Modified Example

Figure 5:
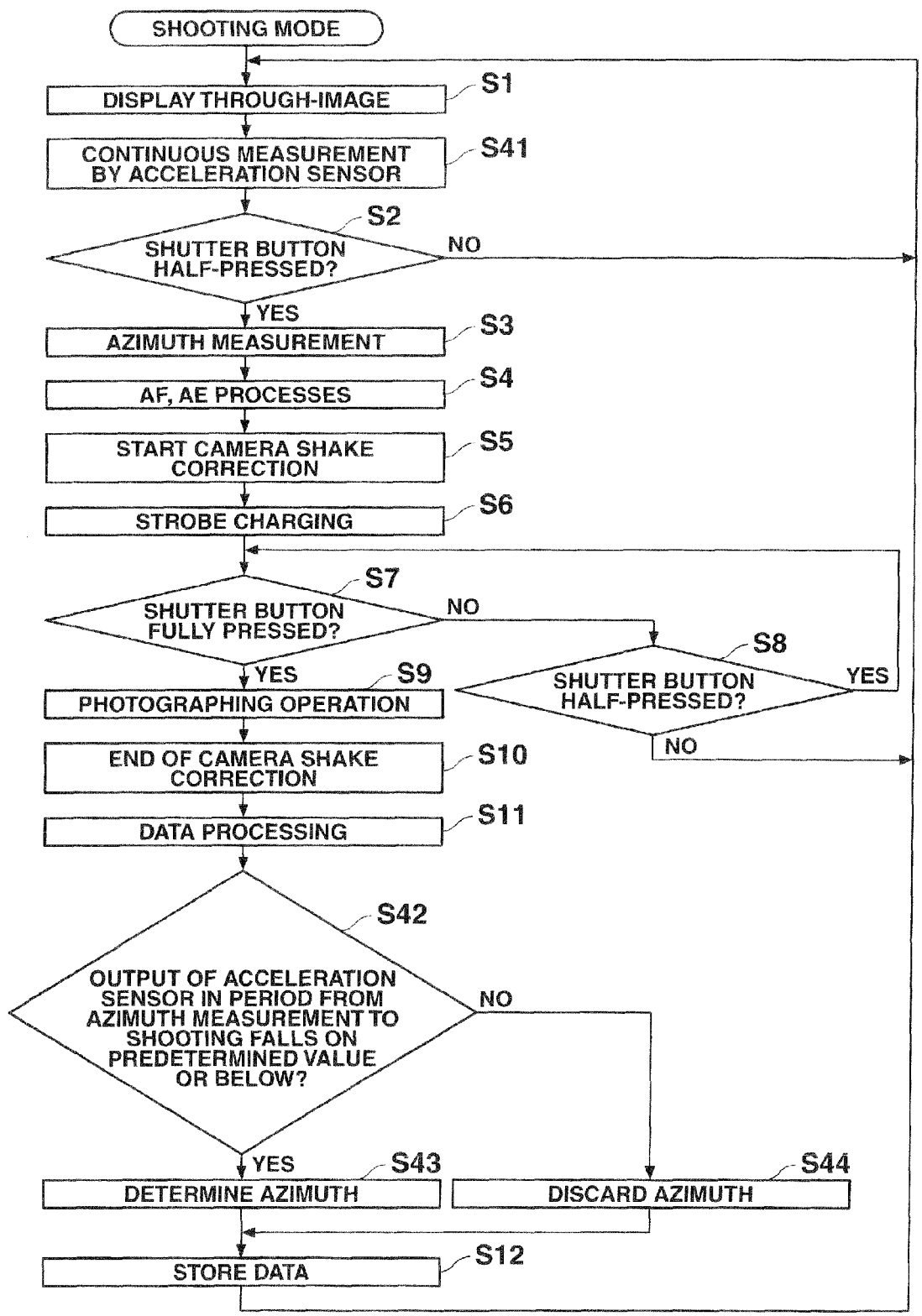
FIG. 5 is a flow chart illustrating procedures of controlling the shooting mode process executed by the main CPU according to a first modified example.

FIG. 5 is a flow chart illustrating procedures of controlling the shooting mode process executed by the main CPU 18 according to a first modified example.

The first modified example is similar to the above-described embodiment, except that some additional processes were given to the shooting mode process.

The description below will explain only the modified aspect.

In the shooting mode process in the first modified example, upon completion of the output process of the through-image in step S1, the main CPU 18 makes the triaxial acceleration sensor 12 start continuous measurement (step S41).

Upon completion of the processes before and after shooting in steps S2 to S11, the main CPU 18 extracts the outputs from the triaxial acceleration sensor 13 yielded over the period from step S3 for the measurement of azimuth up to step S9 for the photographing operation.

The main CPU 18 then judges whether all of acceleration values obtained in the period falls on a predetermined value or below (step S42).

If all values were found to fall on the predetermined value or below, the main CPU 18 determines the azimuth calculated in step S11 as the direction of shooting (step S43).

On the other hand, if even a part of the values was found not to fall on the predetermined value or below, the main CPU 18 discards the data of azimuth calculated in step S11 (step S44).

Next, the main CPU 18 adds data regarding azimuth of shooting direction, if available, to the captured image data, and stores them into the memory card 16 (step S12).

If there is no data regarding azimuth of shooting direction, the main CPU 18 stores the captured image data into the memory card 16 without adding the data regarding azimuth of shooting direction (step S12).

Processes for a single shot thus complete, and the process returns back to step S1.

As described in the above, the digital camera 1 of the first modified example is configured to discard the data regarding direction of shooting, if a predetermined level of acceleration was found to occur in the period from the measurement of azimuth up to the shooting.

More specifically, the camera is configured to discard the data regarding direction of shooting, since it is highly probable that the azimuth of the digital camera 1 has changed in the period from the measurement of azimuth up to the shooting.

In this way, the captured image data may successfully be prevented from being added with erroneous data regarding direction of shooting.

Second Modified Example

The digital camera 1 of the second modified example is similar to the above-described embodiment, except that the time of measurement of direction of shooting, while holding the electric actuator units which possibly generate magnetic fields in a non-driven state, was set in a predetermined period after the photographing operation.

The description below will explain only the modified aspect.

Figure 6:
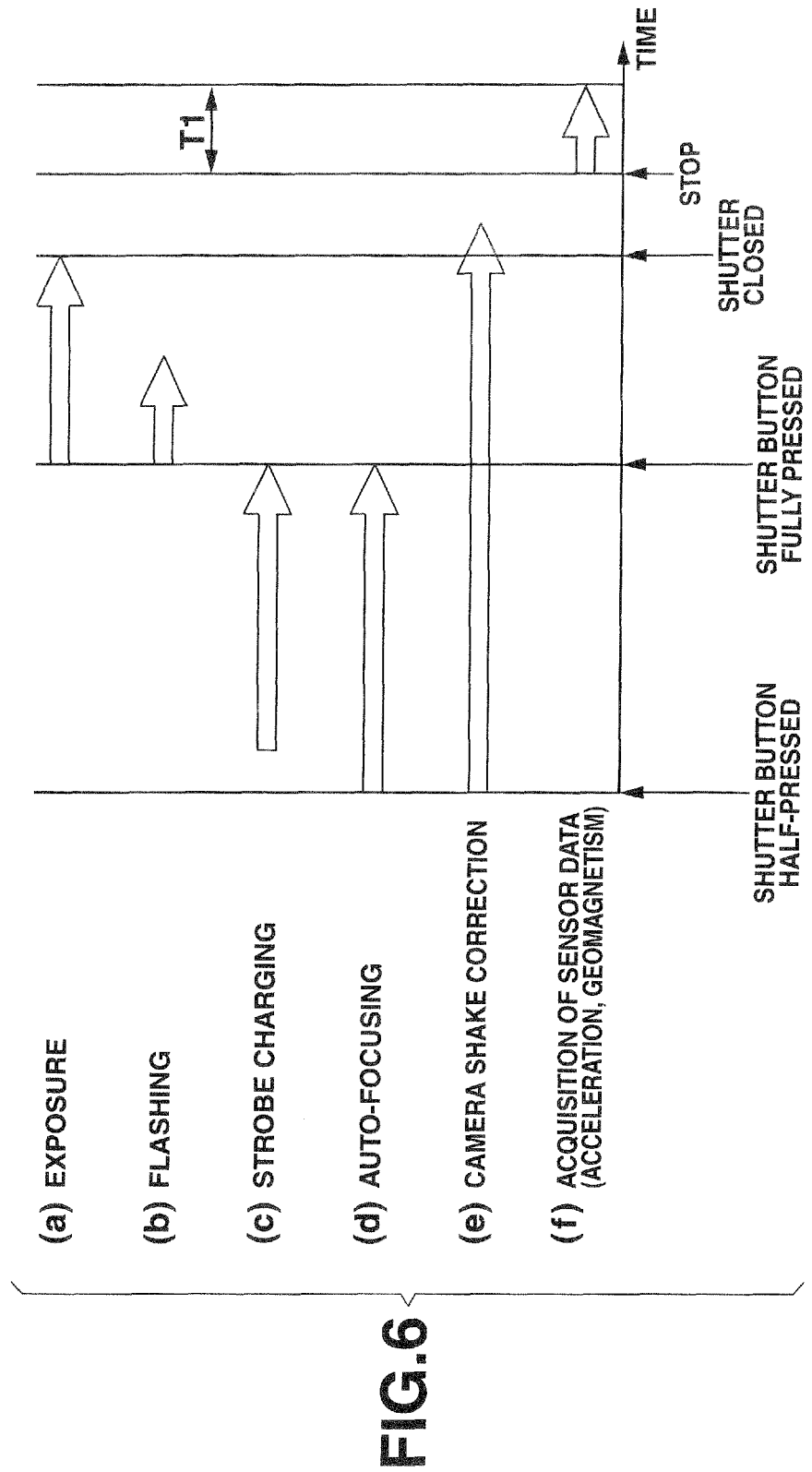
FIG. 6 is a timing chart illustrating operations of the individual units during photographing in a second modified example.

FIG. 6 is a timing chart illustrating operations of the individual units during photographing in the second modified example.

Figure 7:
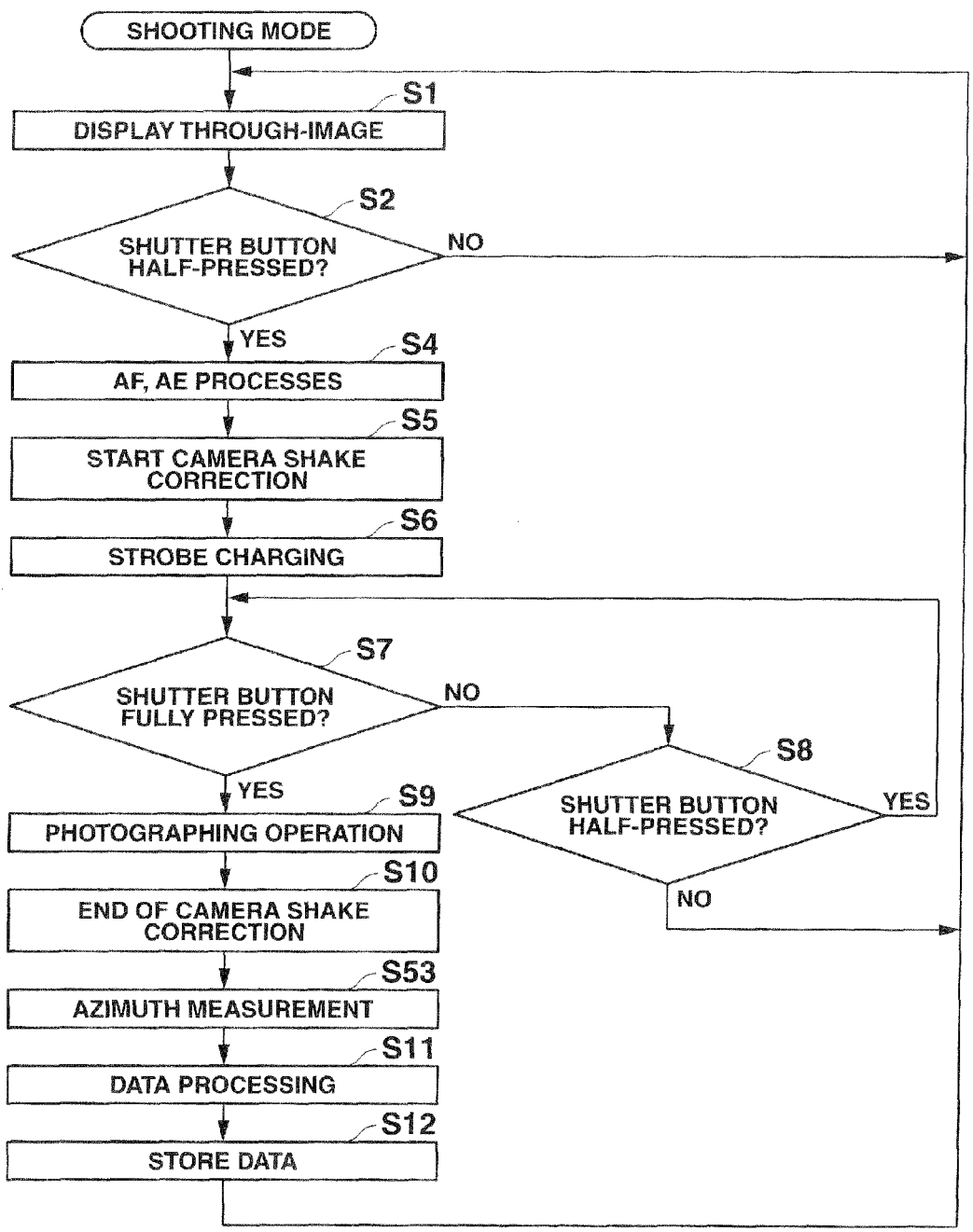
FIG. 7 is a flow chart illustrating procedures of controlling the shooting mode process executed by the main CPU in the second modified example.

FIG. 7 is a flow chart illustrating procedures of controlling the shooting mode process executed by the main CPU in the second modified example.

As illustrated in FIG. 6 and FIG. 7, in the second modified example, the main CPU 18 does not measure the azimuth immediately after half-pressing of the shutter button (step S2).

Instead, immediately after half-pressing of the shutter button (step S2), the main CPU 18 starts process of auto-focusing, auto-exposure, and camera shake correction (steps S4 and S5).

The main CPU 18 also performs strobe charging after half-pressing of the shutter button (step S6).

Upon full pressing of the shutter button (step S7), the main CPU 18 executes the photographing operation (step S9).

Upon closure of the shutter and completion of the camera shake correction (step S10), the main CPU 18 thereafter (following only a slight interval) measures azimuth in the period T1 (step S53).

In other words, the main CPU 18 samples and captures the outputs of the triaxial acceleration sensor 12 and the triaxial geomagnetic sensor 13 for measurement of the azimuth of shooting direction.

The main CPU 18 then makes the image processing unit 15 perform a predetermined image processing of the image data captured thereinto.

The main CPU 18 then calculates the azimuth of shooting direction, based on the sampled data of the outputs captured in step S53 (step S11).

The main CPU 18 adds the data regarding azimuth of shooting direction to the captured image data, and stores them in the memory card 16 (step S12).

Processes for a single shot thus complete, and the process returns back to step S1.

As described in the above, according to the digital camera 1 of the second modified example, the main CPU 18 brings the circuits which possibly generate magnetic fields therearound (the charging circuit for the strobe lighting unit 19, the focusing motor 41, the zooming motor 42, and the diaphragm shutter motor 43) into non-driven state, over a predetermined period after full pressing of the shutter button.

The main CPU 18 is configured to capture the outputs from the triaxial geomagnetic sensor 13, and to calculate azimuth during the period. Accordingly, the main CPU 18 can acquire less-affected outputs from the triaxial geomagnetic sensor 13, and can calculate accurate azimuth.

In addition, since the outputs from the triaxial geomagnetic sensor 13 are captured not so long after the shutter button was fully pressed by the user, the direction of shooting may accurately be calculated.

Note that the present invention is not limited to the above-described embodiment, and allows various modifications.

For example, if it is good enough to measure azimuth only when the photographing device is held horizontally, azimuth may be measured using only a biaxial geometric sensor, while abandoning the triaxial acceleration sensor.

While the outputs of the sensors in the process of shooting are captured immediately after half-pressing of the shutter button in the above-described embodiment and in the first modified example, the outputs of the sensors may alternatively be captured following a short interval after the half-pressing.

The photographing device, having no control regarding half pressing of the shutter button, may be configured to capture the outputs from the sensors immediately after operation of the shutter button, and to make the individual units operate for the photographing operation.

Alternatively, as described in the second modified example, the photographing device may be configured to perform the photographing operation immediately after operation of the shutter button.

Still alternatively, upon completion of the photographing operation, the individual units may be brought into the non-driven state, and the outputs from the sensors may be captured.

In place of setting the sampling frequency for sampling the outputs from the sensors in the process of mode switching, another possible configuration adoptable herein is such as sampling the outputs of the sensors at a frequency set for every time of sampling.

Any other details in the embodiment may properly be modified without departing from the spirit of the present invention.

What is claimed is:

1. A photographing device comprising:
 a photographing unit; a shutter operating unit;
 a geomagnetic sensor which detects geomagnetism;
 an electric actuator unit which is electrically driven to generate magnetic field;
 a drive control unit which turns the electric actuator unit into a non-driven state, within a predetermined period after an operation is entered through the shutter operating unit; and
 a shooting azimuth calculation unit which captures an output from the geomagnetic sensor within the predetermined period, and calculates azimuth based on the captured output.

2. The photographing device of claim 1, further comprising:
 a storage unit which stores captured image data captured by the photographing unit,
 wherein the storage unit stores the azimuth calculated by the shooting azimuth calculation unit in correspondence with the captured image data.

3. The photographing device of claim 1, wherein:
 the electric actuator unit includes a focus drive unit which varies focus of an image to be captured,
 the photographing device further comprises an auto-focus controlling unit which automatically adjusts the focus of the image to be captured by driving the focus drive unit upon half pressing of the shutter operating unit,
 the drive control unit halts the auto-focus controlling unit so as to hold the focus drive unit in a standby mode, over a predetermined period immediately after the half pressing of the shutter operating unit, and
 the shooting azimuth calculation unit captures the output from the geomagnetic sensor within the predetermined period immediately after the half pressing of the shutter operating unit, and calculates the azimuth based on the captured output.

4. The photographing device of claim 1, wherein:
 the electric actuator unit includes a camera-shake-correcting actuator unit which electrically shifts an optical system for generating a captured image or an image capturing unit which converts the captured image into electric signals,
 the photographing device further comprises a camera-shake-correcting controller unit which moderates vibration of an image to be captured due to camera shaking, by driving the camera-shake-correcting actuator unit upon half pressing of the shutter operating unit,
 the drive control unit makes the camera-shake-correcting controller unit hold the camera-shake-correcting actuator unit in a standby mode, over a predetermined period immediately after half pressing of the shutter operating unit, and
 the shooting azimuth calculation unit captures the output from the geomagnetic sensor within the predetermined period immediately after the half pressing of the shutter operating unit, and calculates the azimuth based on the captured output.

5. The photographing device of claim 1, further comprising:
 an acceleration sensor which detects acceleration,
 wherein the shooting azimuth calculation unit calculates an azimuth of a shooting direction, based on the output of the geomagnetic sensor and an output of the acceleration sensor.

6. The photographing device of claim 1, wherein the shooting azimuth calculation unit captures the output of the geomagnetic sensor by sampling the output at a frequency higher than a frequency of a general sampling frequency adopted in a process of measurement of azimuth other than in the process of shooting, and calculates the azimuth based on the sampled data.

7. The photographing device of claim 1, further comprising:
 an acceleration sensor which detects acceleration,
 wherein the azimuth calculated based on the acquired output of the geomagnetic sensor is discarded, when the output of the acceleration sensor is larger than a predetermined value, over the period from a time when the output of the geomagnetic sensor is acquired in the predetermined period during which the electric actuator unit is turned into the non-driven state, to a time when shooting by the photographing unit is performed.

8. The photographing device of claim 1, further comprising:
 an acceleration sensor which detects acceleration; and
 a dead-reckoning positioning unit which performs positioning by measuring a relative distance of travel and a direction of travel, based on the output of the geomagnetic sensor and an output of an acceleration sensor,
 wherein the shooting azimuth calculation unit captures the output of the geomagnetic sensor by sampling the output at a frequency higher than a frequency of a sampling frequency adopted when the dead-reckoning positioning unit captures the output of the geomagnetic sensor in a process of positioning, and calculates the azimuth based on the sampled data.

9. The photographing device of claim 1, wherein:
 the electric actuator unit includes a focus drive unit which varies focus of an image to be captured,
 the drive control unit makes the auto-focus controlling unit stop the focus drive unit, over a predetermined period after shooting by the photographing unit, and
 the shooting azimuth calculation unit captures the output from the geomagnetic sensor within the predetermined period after the shooting by the photographing unit, and calculates the azimuth based on the captured output.

10. The photographing device of claim 1, wherein:
 the electric actuator unit includes a camera-shake-correcting actuator unit which electrically shifts an optical system for generating a captured image or an image capturing unit which converts the captured image into electric signals,
 the drive control unit makes the camera-shake-correcting controller unit stop the camera-shake-correcting actuator unit, over a predetermined period after shooting by the photographing unit, and the shooting azimuth calculation unit captures the output from the geomagnetic sensor within the predetermined period after the shooting by the photographing unit, and calculates the azimuth based on the captured output.

11. A method of controlling a photographing device which includes an image capturing unit, a shutter operating unit, a geomagnetic sensor which detects geomagnetism, and an electric actuator unit which is electrically driven to generate magnetic field, the method comprising:

capturing a signal of the image capturing unit based on an operation entered through the shutter operating unit, and generating a captured image data;

turning the electric actuator unit into the non-driven state, within a predetermined period after the operation is entered through the shutter operating unit; and capturing an output from the geomagnetic sensor within the predetermined period, and calculating azimuth based on the captured output.

12. A non-transitory recording medium having stored thereon a program for controlling a computer, connected to an image capturing unit, a shutter operating unit, a geomagnetic sensor which detects geomagnetism, and an electric actuator unit which is electrically driven to generate magnetic field, perform:

a photographing function for capturing a signal of the image capturing unit based on an operation entered through the shutter operating unit, and generating a captured image data;

a drive control function for turning the electric actuator unit into the non-driven state, within a predetermined period after the operation is entered through the shutter operating unit; and a shooting azimuth calculation function for capturing an output from the geomagnetic sensor within the predetermined period, and calculating azimuth based on the captured output.

\* \* \* \* \*